UNITED STATES PATENT OFFICE.

WILHELM HIEMENZ AND WALTER KROPP, OF ELBERFELD, GERMANY, ASSIGNORS TO FARBENFABRIKEN VORM. FRIEDR. BAYER & CO., OF ELBERFELD, GERMANY, A CORPORATION OF GERMANY.

THERAPEUTICAL COMPOUND.

1,056,674.      Specification of Letters Patent.      Patented Mar. 18, 1913.

No Drawing.      Application filed August 28, 1911. Serial No. 646,375.

*To all whom it may concern:*

Be it known that we, WILHELM HIEMENZ and WALTER KROPP, doctors of philosophy, chemists, citizens of the German Empire, residing at Elberfeld, Germany, have invented new and useful Improvements in Therapeutical Compounds, of which the following is a specification.

The present application which is in part a continuation of application from our application Ser. No. 632424, filed June 10, 1911 concerns the production of the hitherto unknown esters of mono- and di-iodocinnamic acid of the formula

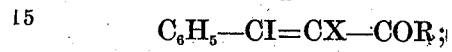

$C_6H_5\text{—}CI\text{=}CX\text{—}COR;$

X=H or I, R=$OC_2H_5$, —$OC_3H_7$, —$OC_6H_4$—$OCH_3$, etc., which are stable pure iodin preparations. They give off iodin in the organism and have proved to be valuable remedies in medicine, especially for treatment of venereal diseases, an average dose being from 2–3 grams. Clinical experience has shown that the symptoms of iodism are very rarely observed in their administration.

The process for producing the new esters consists in converting the iodocinnamic acids, such as diiodocinnamic acid, beta-iodocinnamic acid, etc., into the chlorids and heating the chlorids of the iodo or di-iodocinnamic acids with alcohols or in introducing iodin into the esters of the phenylpropiolic acids.

Our new preparations are crystallizable compounds. They are insoluble in water and are decomposed by treatment with a hot alcoholic solution of caustic potash.

In order to produce our new substances, we can proceed as follows, the parts being by weight:—

Example 1: 25 parts of the ethyl ester of phenylpropiolic acid (Perkin, *Soc.* 45, 1884, page 174) are heated in 150 parts of glacial acetic acid with 50 parts of iodin while stirring for 12–15 hours to 70–80° C. The ester which has the formula

$C_6H_5\text{—}CI\text{=}CI\text{—}COOC_2H_5$ is then precipitated with water from this solution. It can be recrystallized from alcohol, melts at 63° C. and is easily soluble in ether but difficultly in water. Glacial acetic acid can be replaced by other solvents *e. g.* carbon-disulfite, carbon-tetrachlorid, etc. Other derivatives can also be iodized in the same manner with or without a carrier of iodin.

Example 2: 12 parts of beta-iodocinnamic acid (Michael, *Ber. d. Deutschen Chem. Ges.* 34, 1901, page 3659) are heated with 10 parts of $PCl_5$ in 50 parts of carbon tetrachlorid for three hours to 50–60° C. Carbon-tetrachlorid and $POCl_3$ are removed *in vacuo* and the residue is dissolved in 25 parts of carbon-tetrachlorid and mixed with 5.5 parts of guaiacol in 25 parts of carbon-tetrachlorid. The mixture is boiled for six hours until the evolution of hydrochloric acid ceases. Guaiacol ester separates from the cooled mixture in the shape of yellow crystals showing the melting point: 131° C. This substance is insoluble in water and difficulty soluble in ligroin, carbon-tetrachlorid and petrol ether. It is rather soluble in ether, alcohol and benzene when heated and easily soluble in acetone and chloroform. The ethyl ester of paranitro-di-iodocinnamic acid crystallizes in the shape of yellow prismatic crystals melting at 89° C.

We claim:—

1. As new products esters of iodocinnamic acids, which are practically insoluble in water, being decomposed by treatment with hot alcoholic potash solution into potassium iodid and phenylpropiolic acid.

2. As new products alkyl esters of iodocinnamic acids, which are practically insoluble in water, being decomposed by treatment with hot alcoholic potash solution into potassium iodid and phenylpropiolic acid.

3. As new products esters of di-iodo-cinnamic acids, which are practically insoluble in water, being decomposed by treatment with hot alcoholic solution into potassium iodid and phenylpropiolic acid.

4. As new products alkyl esters of di-iodocinnamic acids, which are practically insoluble in water, being decomposed by treatment with hot alcoholic solution into potassium iodid and phenylpropiolic acid.

5. The ethyl ester of diiodocinnamic acid which crystallizes from alcohol in the shape of hexagonalic plates melting at 63° C. being easily soluble in ether, but soluble with difficulty in water, substantially as described.

In testimony whereof we have hereunto set our hands in the presence of two subscribing witnesses.

WILHELM HIEMENZ. [L. S.]
WALTER KROPP. [L. S.]

Witnesses:
L. NUFER,
ALBERT F. NUFER.